United States Patent
Sato et al.

(10) Patent No.: US 7,538,179 B2
(45) Date of Patent: *May 26, 2009

(54) PROCESS FOR PRODUCING ALIPHATIC POLYESTER

(75) Inventors: Hiroyuki Sato, Fukushima-Ken (JP); Fumio Akutsu, Fukushima-Ken (JP); Fuminori Kobayashi, Fukushima-Ken (JP); Yasushi Okada, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 339 days.

This patent is subject to a terminal disclaimer.

(21) Appl. No.: 10/577,379

(22) PCT Filed: Nov. 4, 2004

(86) PCT No.: PCT/JP2004/016706

§ 371 (c)(1),
(2), (4) Date: Apr. 28, 2006

(87) PCT Pub. No.: WO2005/044894

PCT Pub. Date: May 19, 2005

(65) Prior Publication Data

US 2007/0073033 A1  Mar. 29, 2007

(30) Foreign Application Priority Data

Nov. 5, 2003  (JP) .............................. 2003-376221

(51) Int. Cl.
*C08G 63/00* (2006.01)
*C08G 63/02* (2006.01)

(52) U.S. Cl. ....................... 528/272; 422/129; 422/131; 502/150; 528/271

(58) Field of Classification Search ................. 422/129, 422/131; 502/150; 528/271, 272
See application file for complete search history.

(56) References Cited

U.S. PATENT DOCUMENTS

| | | | | |
|---|---|---|---|---|
| 2,937,164 A | * | 5/1960 | Brown et al. | 525/329.3 |
| 2,945,012 A | | 7/1960 | Berens | |
| 5,885,709 A | * | 3/1999 | Wick et al. | 428/364 |

FOREIGN PATENT DOCUMENTS

| | | |
|---|---|---|
| EP | 0 299 730 | 1/1989 |
| EP | 0 624 613 | 11/1994 |
| EP | 1 048 683 | 11/2000 |
| EP | 1 550 682 | 7/2005 |
| EP | 1 686 146 | 8/2006 |
| JP | 57-094019 | * 6/1982 |
| JP | 10-25288 | 1/1998 |
| JP | 2000-128963 | 5/2000 |

* cited by examiner

*Primary Examiner*—Terressa M Boykin
(74) *Attorney, Agent, or Firm*—Wenderoth, Lind & Ponack, L.L.P.

(57) ABSTRACT

Ring-opening polymerization of a cyclic ester is performed by using an alcohol and water positively as initiators or/and molecular weight-adjusting agents to control the initial properties and properties with time of the resultant aliphatic polyester. More specifically, an aliphatic polyester is produced by ring-opening polymerization of a cyclic ester containing water and an alcohol based on a total proton concentration and a ratio between a mol concentration of carboxyl (carboxylic acid)-source compounds including water and a mol concentration of alkoxycarbonyl (ester)-source compounds, as polymerization-controlling indexes.

12 Claims, 2 Drawing Sheets

PROCESS FOR PRODUCING ALIPHATIC POLYESTER

TECHNICAL FIELD

The present invention relates to a process for producing an aliphatic polyester, such as polyglycolic acid, by ring-opening polymerization of a cyclic ester, such as glycolide, and more particularly to an improvement in process for producing an aliphatic polyester by subjecting a cyclic ester to ring-opening polymerization using water (or moisture) and alcohol positively as initiators or/and molecular weight-adjusting agents.

BACKGROUND ART

Aliphatic polyesters, such as polyglycolic acid and polylactic acid, can be decomposed by microorganisms or enzymes present in nature, such as soil or sea water, so that they are noted as biodegradable polymer materials giving little load to the environment. Further, aliphatic polyesters are utilized as polymer materials for medical use, such as sutures for surgery or artificial skin, since they can be decomposed or absorbed in vivo.

Among the aliphatic polyesters, polyglycolic acid is excellent in gas-barrier properties, such as oxygen gas-barrier property, carbon dioxide gas-barrier property and water vapor-barrier property and also excellent in heat resistance and mechanical properties, and therefore the development of new use thereof is under way singly or in a composite state together with another resin material in the fields of packaging materials, etc.

An aliphatic polyester can be synthesized by dehydropolycondensation of an α-hydroxycarboxylic acid, such as glycolic acid or lactic acid, but in order to effectively synthesize an aliphatic polyester of a high molecular weight, there has been generally adopted a process of synthesizing a bimolecular cyclic ester of an α-hydroxycarboxylic acid and subjecting the cyclic ester to ring-opening polymerization. For example, by ring-opening polymerization of glycoide that is a bimolecular cyclic ester or cyclic diester of glycolic acid, polyglycolic acid is obtained. By ring-opening polymerization of lactide that is a bimolecular cyclic ester of lactic acid, polylactic acid is obtained.

A cyclic ester generally contains impurities including free carboxylic acid compounds, such as an α-hydroxycarboxylic acid used as the starting material and linear α-hydroxycarboxylic acid oligomers, and water. As impurities, such as water, even in a minute amount, can adversely affect the ring-opening polymerization of a cyclic ester, it has been proposed to use a high-purity cyclic ester from which impurities have been removed as far as possible in the ring-opening polymerization.

On the other hand, an alcohol such as a higher alcohol has been used as a molecular weight-adjusting agent in ring-opening polymerization of a cyclic ester in order to control the molecular weight of the aliphatic polyester. There has been also proposed a method of determining an addition amount of the alcohol based on the amount of free carboxylic acid compounds contained in the cyclic ester.

For example, in the ring-opening polymerization of glycolide, there has been proposed heretofore a method of using substantially pure glycolide purified by re-crystallization, etc. and also using a higher alcohol such as lauryl alcohol as a molecular weight-adjusting agent (e.g., Patent document 1b listed below).

Further, a purification method of removing impurities such as water from a cyclic ester (e.g., Patent document 2 listed below). In this document, it is pointed out that impurities, such as water, α-hydroxycarboxylic acid and low-molecular weight oligomers thereof, contained in a cyclic ester, should be removed, since they exert various functions as an initiator, a chain transfer agent, a catalyst deactivator, etc., to obstruct the ring-opening polymerization.

There has been proposed a process for producing an aliphatic polyester by ring-opening polymerization of a cyclic ester having a water content of at most 80 ppm and an acid value of at most 0.10 mg KOH/g (e.g., Patent document 3 listed below). This document contains a description to the effect that the reduction of water content in a cyclic ester accelerates the polymerization speed and allows the production of a high-molecular weight polymer, and the presence of an alcohol in the polymerization system suppresses the function of water content to allow the production of an aliphatic polyester of a good quality.

As a process for producing an aliphatic polyester by ring-opening polymerization of a cyclic ester, there has been proposed a production process characterized by determining the amount of a hydroxyl compound added to the reaction system based on the amount of free carboxylic acid compounds contained in the cyclic ester (e.g., Patent document 4 listed below). The document discloses α-hydroxycarboxylic acid used for production of the cyclic ester and linear oligomers of the α-hydroxycarboxylic acid as the free carboxylic acid compounds, and describes that monohydric linear saturated alcohols having 12-18 carbon atoms are preferred as the hydroxyl compound.

The document points out that if impurities, such as water and free carboxylic acid compounds, are contained in a cyclic ester, they adversely affects the polymerization reaction and it becomes impossible to effect a targeting, i.e., production of a polymer with an objective molecular weight, even under identical polymerization conditions. The document describes that the control of a molecular weight of aliphatic polyester is liable to be difficult at a large water content and it is preferred to control the water or moisture content in the cyclic ester to at most 100 ppm in order to accurately control the molecular weight.

The document further describes that water in a cyclic ester can be easily removed by purification and drying steps immediately before the polymerization, but free carboxylic acid compounds are difficult to remove and greatly affect the polymerization, and moreover, a cyclic ester is liable to cause ring-opening due to a minute amount of water during the storage to produce free carboxylic acid compounds anew. The document has proposed a process for producing an aliphatic polyester of a target molecular weight by determining the amount of free carboxylic acid compounds contained in a cyclic ester and adding an amount of hydroxyl compound (e.g., a higher alcohol) corresponding thereto.

Patent document 1: U.S. Pat. No. 3,442,871
Patent document 2: JP-A 8-301864
Patent document 3: JP-A 10-158371
Patent document 4: JP-B 3075665

As described above, water has been recognized as an impurity obstructing the ring-opening polymerization of a cyclic ester and should be removed as far as possible. However, water is the most universal compound present in nature, and the removal thereof as an impurity is confronted with a certain limit. The present inventors, et al, performed a detailed study about the function of water in the system of ring-opening polymerization of a cyclic ester and, as a result thereof, found it possible to control the molecular weight of a resultant aliphatic polyester by using a proton-source compound including water as a molecular weight-adjusting agent and controlling a total proton concentration in the cyclic ester to smoothly proceed with the ring-opening polymerization of a cyclic ester. Based on the knowledge, a process for producing an aliphatic polyester has been already proposed (WO2004/033527A).

DISCLOSURE OF INVENTION

A principal object of the present invention is to provide a novel process for producing having advanced from the above-mentioned process for producing an aliphatic polyester.

According to further study of the present inventors, it has been confirmed that proton-source compounds including water and alcohol exhibit substantially identical functions and effects as initiators or/and molecular weight-adjusting agents, whereas it has been found that carboxyl (carboxylic acid)-source compounds including water and alkoxy-carbonyl (ester)-source compounds exhibit different and contrary functions in that the former increases the hydrolyzability (i.e., decreases the moisture-resistance) and the latter decreases the hydrolyzability (i.e., increases the moisture resistance) of the resulting aliphatic polyester. Accordingly, it has been found possible to well regulate the molecular weight controlling the initial property and hydrolyzability (molecular weight decrease with time) controlling the property change with time of the resulting aliphatic polyester.

Thus, based on the above findings, the present invention provides a process for producing an aliphatic polyester, comprising: subjecting a cyclic ester containing water and an alcohol as initiators or/and molecular weight-adjusting agents to ring-opening polymerization based on a total proton concentration and a ratio (carboxylic acid/ester mol ratio) between a mol concentration of carboxyl (carboxylic acid)-source compound including water and a mol concentration of alkoxylcarbonyl (ester)-source compounds, as polymerization-controlling indexes.

The production of an aliphatic polyester having controlled initial property and controlled property changing with time according to the present invention is believed to be very significant for promoting the utilization of aliphatic polyesters for products requiring a harmonization between, e.g., initial strength and in vivo decomposability (or absorbability), such as sutures, artificial skins, films for agricultural use, and fishing lines.

BEST MODE FOR PRACTICING THE INVENTION

1. Cyclic Ester

Preferred cyclic esters used in the present invention may include cyclic diesters of α-hydroxycarboxylic acids and lactones. Examples of the α-hydroxycarboxylic acids providing the cyclic diesters may include: glycolic acid, L-and/or D-lactic acid, α-hydroxybutanoic acid, α-hydroxyisobutanoic acid, α-hydroxyvaleric acid, α-hydroxycaproic acid, α-hydroxy-isocaproic acid, α-hydroxyheptanoic acid, α-hydroxy-octanoic acid, α-hydroxydecanoic acid, α-hydroxymyristic acid, α-hydroxystearic acid, and allyl-substituted products thereof.

Examples of the lactones include β-propiolactone, β-butyrolactone, pivalolactone, γ-butyrolactone, δ-valerolactone, β-methyl-δ-valerolactone and ε-caprolactone. The cyclic etheresters may include dioxanone, for example.

A cyclic ester having an asymmetric carbon atom may be any of a D-isomer, an L-isomer and a racemic mixture of these. These cyclic esters may be used either singly or in any combination thereof. When 2 or more cyclic esters are used in combination, an arbitrary aliphatic copolyester can be obtained. The cyclic ester may be copolymerized with another comonomer. Examples of such another comonomer include cyclic monomers such as trimethylene carbonate and 1,3-dioxanone.

Among the cyclic esters, glycolide, which is a cyclic diester of glycolic acid, L- and/or D-lactide, which is a cyclic diester of L- and/or D-lactic acid, and mixtures thereof are preferred, with glycolide being more preferred. Glycolide may be used alone. However, it may also be used in combination with another cyclic monomer to produce a polyglycolic acid copolymer (copolyester). When the polyglycolic acid copolymer is produced, it is desirable that a proportion of glycolide copolymerized is preferably at least 60% by weight, more preferably at least 70% by weight, particularly preferably at least 80% by weight from the viewpoint of physical properties of the copolyester formed, such as crystallinity and gas-barrier properties. Preferable examples of the cyclic monomer copolymerized with glycolide include lactide, ε-caprolactone, dioxanone and trimethylene carbonate.

No particular limitation is imposed on the production process of the cyclic ester. For example, glycolide can be obtained by a process comprising depolymerizing a glycolic acid oligomer. As the depolymerization process of the glycolic acid oligomer, may be adopted, for example, a melt depolymerization process described in U.S. Pat. No. 2,668,162, a solid-phase depolymerization process described in JP-A 2000-119269, or a solution-phase depolymerization process described in JP-A 328481/1997 and WO 02/14303A1. Glycolide obtained as a cyclic condensate of a chloroacetic acid salt, which is reported in K. Chujo, et al., Die Makromolekulare Cheme, 100 (1967), 262-266, can also be used.

Among the depolymerization processes described above, the solution-phase depolymerization process is preferred for obtaining glycolide. According to the solution-phase depolymerization process, (1) a mixture containing a glycolic acid oligomer and at least one high-boiling polar organic solvent having a boiling point within a range of 230-450° C. is heated to a temperature, at which the depolymerization of the oligomer takes place, under ordinary pressure or under reduced pressure; (2) the oligomer is dissolved in the solvent until a residual rate (volume ratio) of a melt phase of the oligomer reaches 0.5 or lower, (3) the heating is further continued at the same temperature to depolymerize the oligomer, (4) a cyclic diester (i.e., glycolide) formed is distilled out together with the high-boiling polar organic solvent, and (5) glycolide is recovered from the distillate.

Examples of the high-boiling polar organic solvent may include aromatic carboxylic acid esters, such as bis(alkoxyalkyl)phthalates such as di(2-methoxyethyl)phthalate, alkylene glycol dibenzoates such as diethylene glycol dibenzoate, benzylbutyl phthalate, and dibutyl phthalate; aromatic phosphoric acid esters such as tricresyl phosphate; and polyalkylene glycol ethers such as polyethylene dialkyl ethers. The high-boiling polar organic solvent is generally used in an amount of 0.3 to 50 times the weight of the oligomer. Polypropylene glycol, polyethylene glycol, tetraethylene glycol or the like may be used as a solubilizing agent for the oligomer in combination with the high-boiling polar organic solvent as needed. The depolymerization temperature of the glycolic acid oligomer is generally 230° C. or higher, preferably 230 to 320° C. Although the depolymerization is performed under atmospheric pressure or reduced pressure, it is preferable to heat the oligomer under a reduced pressure of 0.1 to 90.0 kPa (1 to 900 mbar) to depolymerize it.

A cyclic ester purified to a water content of at most 60 ppm (by weight), preferably at most 50 ppm, more preferably at most 40 ppm, is preferably used as the cyclic ester. If the initial water content in the cyclic ester used is too high, the controllable range of melt viscosity and molecular weight of the resulting polymer are limited even when water is added as the molecular weight-adjusting agent.

The content of hydroxycarboxylic compounds contained as impurities in the cyclic ester is preferably as low as possible. The content of an α-hydroxycarboxylic acid in the cyclic ester is preferably at most 200 ppm (by weight), more preferably at most 150 ppm, still more preferably at most 130 ppm, particularly preferably at most 100 ppm.

Linear α-hydroxycarboxylic acid oligomers are generally contained in the cyclic ester. Most of these oligomers are linear α-hydroxycarboxylic acid dimmer. The content of the linear α-hydroxycarboxylic acid oligomers in the cyclic ester is preferably at most 2,000 ppm (by weight), more preferably at most 1,500 ppm, still more preferably at most 1,200 ppm, particularly preferably at most 1,000 ppm.

Cyclic esters such as glycolide and lactide undergo hydrolysis reaction and polymerization reaction with a minute amount of water contained as impurities during their storage and thus show a tendency to increase the contents of α-hydroxycarboxylic acids and α-hydroxycarboxylic acid oligomers. Therefore, it is desirable that the water content in the cyclic ester just after purification is at most 50 ppm, the α-hydroxycarboxylic acid content is at most 100 ppm, and the linear α-hydroxycarboxylic acid oligomer content is at most 1,000 ppm. Incidentally, the purification of the cyclic ester may be performed by combining a recrystallization treatment, a drying treatment and the like with each other in accordance with a method known per se in the art.

2. Production Process for Aliphatic Polyester

In order to produce an aliphatic polyester using the cyclic ester, it is preferred to adopt a process comprising heating the cyclic ester to cause ring-opening polymerization. This ring-opening polymerization process is performed substantially a bulk. The ring-opening polymerization is conducted at a temperature within a range of generally 100 to 270° C., preferably 120 to 260° C. in the presence of a catalyst.

No particular limitation is imposed on the catalyst so far as it may be used as a ring-opening polymerization catalyst for respective cyclic esters. Specific examples of such catalysts include metallic compounds such as oxides, chlorides, carboxylates and alkoxides of tin (Sn), titanium (Ti), aluminum (Al), antimony (Sb), zirconium (Zr) and zinc (Zn). More specifically, preferable examples thereof include tin compounds such as tin halides (for example, tin dichloride, tin tetrachloride, etc.) and organic tin carboxylates (for example, tin octanoates such as tin 2-ethylhexanoate); titanium compounds such as alkoxytitanium; aluminum compounds such as alkoxyaluminum; zirconium compounds such as zirconium acetylacetone; and antimony halides. However, these are not exhaustive.

The amount of the catalyst used may be in a small amount relative to the cyclic ester and is selected from a range of generally 0.0001 to 0.5% by weight, preferably 0.001 to 0.1 wt. % based on the cyclic ester.

In the preset invention, the contents of water and hydroxycarboxylic compounds contained as impurities in the cyclic ester are determined prior to the ring-opening polymerization to calculate a total proton quantity in the in the impurities based on the respective contents, and setting the water content in the cyclic ester to a value exceeding 80 ppm, particularly a value exceeding 100 ppm. The water content in the cyclic ester may be measured by means of a Karl Fischer's aquameter. The α-hydroxycarboxylic acids and linear α-hydroxycarboxylic acid oligomers contained in the cyclic ester are determined by gas chromatographic analysis or the like after the respective carboxylic groups are converted into alkyl ester groups.

The total proton concentration of the impurities contained in the cyclic ester is calculated on the basis of the total quantity of the hydroxycarboxylic compounds and water contained as impurities in the cyclic ester. In the case of, for example, glycolide, minute amounts of water and hydroxycarboxylic compounds composed of glycolic acid and linear glycolic acid oligomers are contained as the impurities. Most of the linear glycolic acid oligomers contained in purified glycolide are a dimer of glycolic acid. In the case of lactide, water, lactic acid and linear lactic acid oligomers are contained as the impurities. The proton concentration (mol %) based on these hydroxycarboxylic compounds is calculated on the basis of the contents and molecular weights of the respective compounds and the number of hydroxyl groups (generally one hydroxyl group). The proton concentration (mol %) of water is calculated on the basis of the content and molecular weight of water. The proton concentration is calculated as mol % based on the total amount of the cyclic ester and impurities.

The total proton concentration of the impurities contained in the cyclic ester is preferably 0.01 to 0.5 mol %, more preferably 0.02 to 0.4 mol %, particularly preferably 0.03 to 0.35 mol %. Since there is a certain limit to lowering of the contents of the hydroxycarboxylic compounds by purification, it is difficult to extremely lower the total proton concentration of the impurities. If the total proton concentration of the impurities is too high, it is difficult to precisely control the melt viscosity and molecular weight of the resulting polymer by addition of water and an alcohol.

In the present invention, an alcohol and optional additional water are added to a cyclic ester purified down to a water content of preferably at most 60 ppm to adjust the total proton concentration and the ratio (hereinafter referred to as the "carboxylic acid/ester mol ratio") between a mol concentration of the carboxyl (carboxylic acid)-source compounds including water and a mol concentration of the alkoxycarbonyl (ester)-source compounds including alcohol in the cyclic ester, thereby controlling the molecular weight of an aliphatic polyester formed. The total proton concentration in the cyclic ester is controlled within a range of preferably higher than 0.09 mol %, but lower than 2.0 mol %, more preferably 0.1 to 1.0 mol % by adding an alcohol and optional additional water to the purified cyclic ester.

A characteristic of the present invention is to use water in a range in excess of 80 ppm (ca. 0.052 mol % as a mol concentration in glycolide), further in excess of 100 ppm (ca. 0.064 mol % as a mol concentration in glycolide), in terms of a concentration in the cyclic ester, positively as an initiator or/and a molecular weight-adjusting agent, and also as a carboxyl (carboxylic acid)-source compound, in this instance.

Further, by controlling the amounts of the added alcohol and optional additional water, the carboxylic acid/ester mol ratio is controlled at preferably 100/0-2/98, more preferably 99/1-5/95, further preferably 99/1-10/90.

If the carboxylic acid/ester mol ratio is below 2/98, the amount of alcohol species used in the polymerization becomes large and is liable to remain untreated to result in large fluctuation of molecular weight and melt-viscosity during melt-processing of the resultant polymer, thus making it difficult to provide a shaped product of desired properties (molecular weight, melt-viscosity, etc.). Further, the reaction with a stabilizer and a terminal capping agent added at the time of the melting to result in large fluctuations of physical properties and hydrolyzation rate of the shaped product.

Examples of the alcohol added as a proton-source compound and an alkoxycarbonyl (ester)-source compound may include: lower and medium alcohols which are aliphatic alcohols having 1-5 carbon atoms, and higher alcohols which are aliphatic alcohols having 6 or more carbon atoms. These aliphatic alcohols can have a branched structure. Further, alicyclic alcohols, unsaturated alcohols, aromatic alcohols and polyols are also included. Further, it is also possible to use hydroxycarboxylic acids having a hydroxyl group and saccharides.

Preferred among these are medium or higher alcohols having at least 3 carbon atoms, such as propanol, 2-propanol, butanol, 2-butane-ol, t-butyl alcohol, octyl alcohol, dodecyl alcohol (lauryl alcohol) and myristyl alcohol, alicyclic alcohols, such as cyclohexanol; diols, such as ethylene glycol, butane diol and hexane diol; and triols, such as glycerin, in view of the solubility in the monomer, in view of the solubility in the monomer, reactivity (initiator efficiency), boiling point and commercial availability. These alcohols can be used in two or more species in combination.

Figure 1:
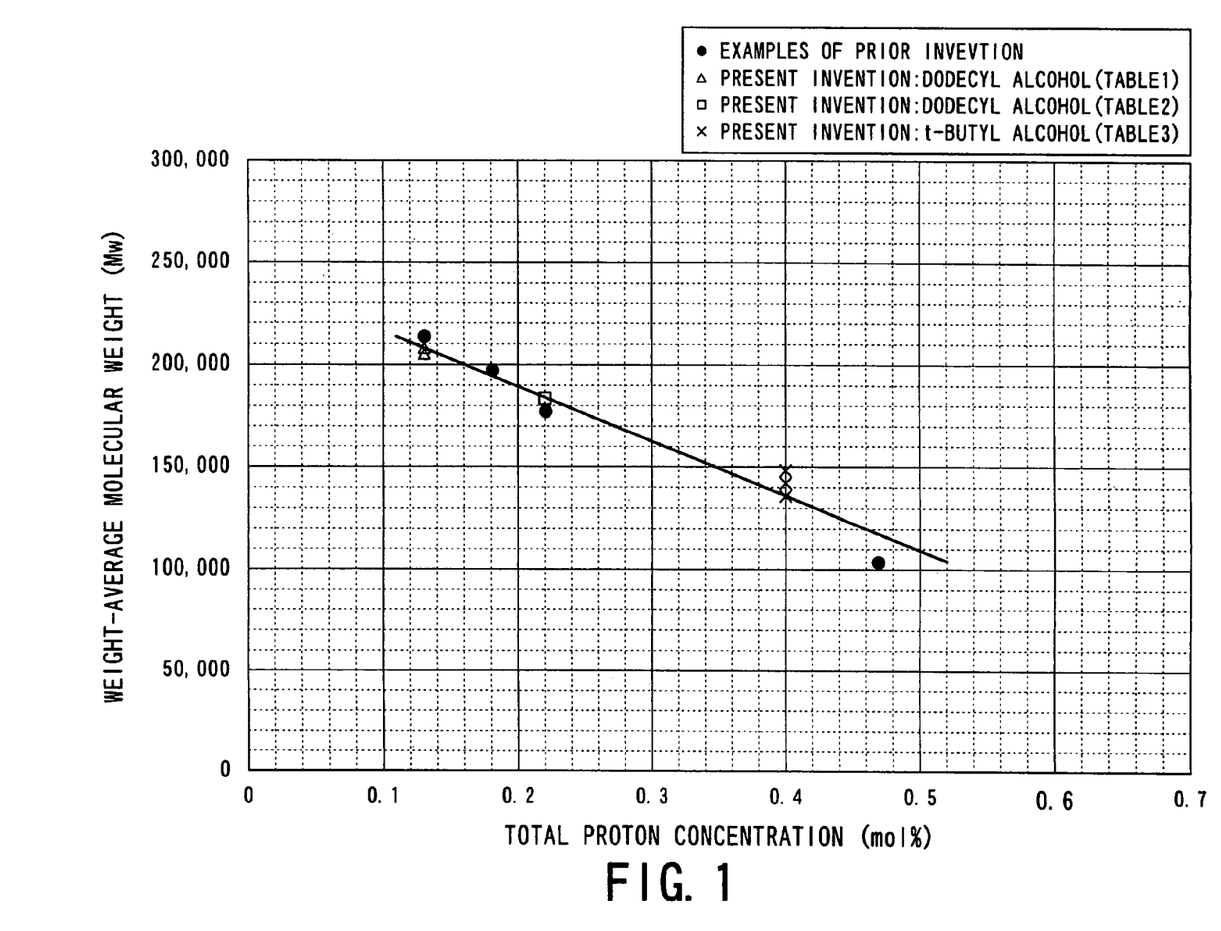
FIG. 1 is a data plot showing a correlation between weight-average molecular weights (Mw) of aliphatic polyesters obtained through the production process of the present invention and total proton concentrations in cyclic esters.

There has been found a good correlation between a total proton concentration in the cyclic ester at the time of polymerization including water, alcohol and impurities in the starting monomer and a molecular weight of the resultant aliphatic polyester. For example, FIG. 1 is a data plot showing a relationship between varying total proton concentrations by changing the addition amounts of water and alcohol otherwise under identical polymerization conditions (reaction vessel, polymerization temperature, species and purity of monomer, etc.) and the weight-average molecular weights (Mw) of the resultant aliphatic polyesters.

Figure 2:
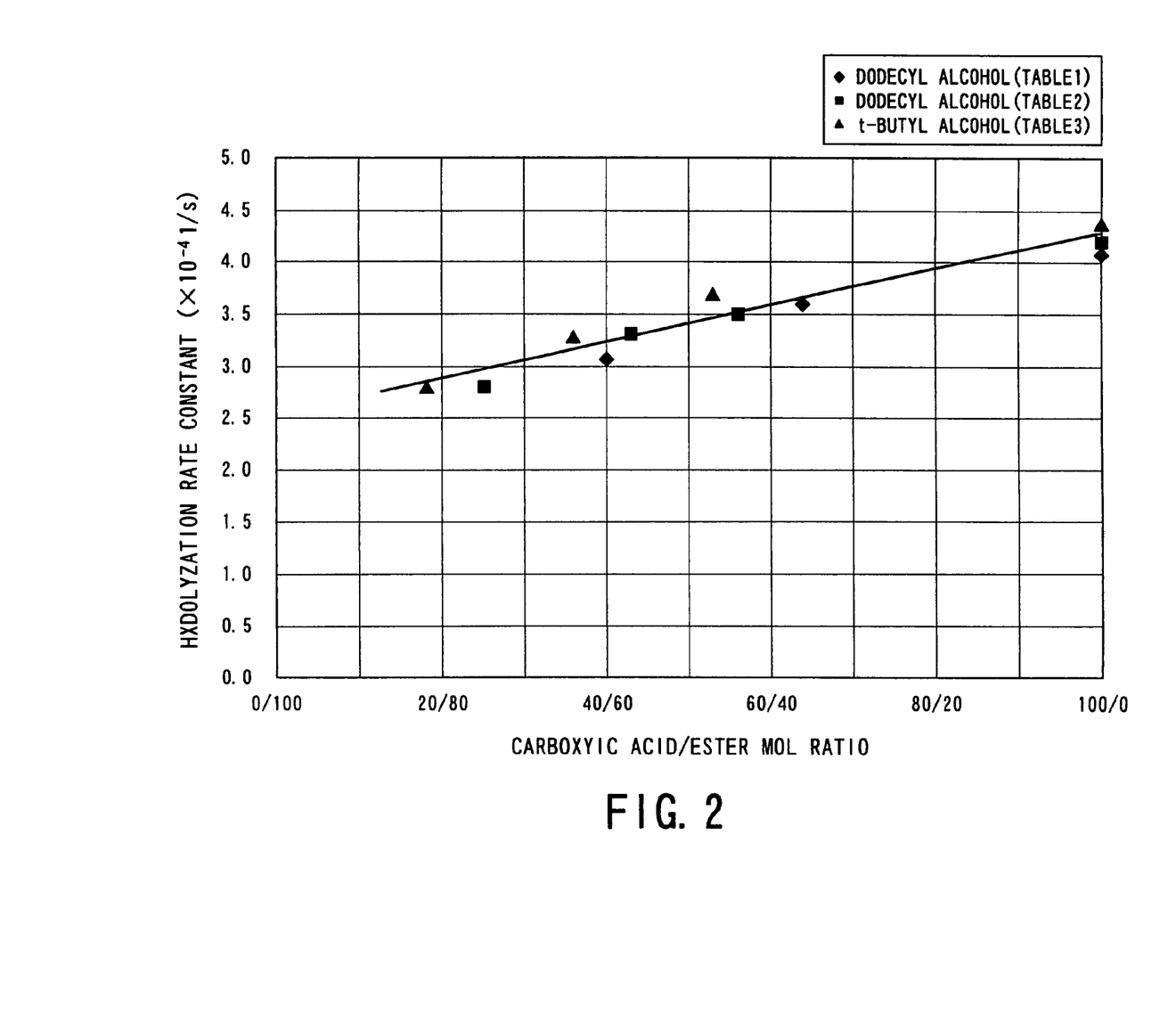
FIG. 2 is a data plot showing a correlation between hydrolyzation rate constants of products aliphatic polyesters and carboxylic acid/ester mol ratios.

Further, FIG. 2 provides a data plot showing a correlation between the hydrolyzation rate constants of product aliphatic polyesters and the carboxylic acid/ester mol ratios in the cyclic ester. Also herein, a good correlation is found.

The ring-opening polymerization of the cyclic ester may be optionally conducted by means of a polymerization vessel or in an extruder according to the kind of the monomer used. However, it is generally preferable to adopt a method of conducting bulk ring-opening polymerization in the polymerization vessel. For example, when glycolide is heated, it is melted in a liquid state, whereas a polymer is formed when the heating is continued to subject the melt to ring-opening polymerization. In a polymerization reaction system whose polymerization temperature is lower than a crystallization temperature of a polymer formed, a polymer is precipitated in the course of the polymerization reaction, and a solid polymer is finally obtained. The polymerization time varies according to the method of the ring-opening polymerization, polymerization temperature, etc. However, it is generally 10 minutes to 100 hours, preferably 30 minutes to 50 hours, more preferably 1 to 30 hours. The conversion of polymerization is generally at least 95%, preferably at least 98%, more preferably at least 99%. It is however the most preferred that the monomer be fully converted from the viewpoints of decreasing the residual amount of unreacted monomer and enhancing production efficiency.

Accordingly, in the present invention, it is preferred to adopt a process of adding water to a purified cyclic ester to control the total proton concentration in the cyclic ester, heating and melting the cyclic ester in the presence of a catalyst and then subjecting the cyclic ester to ring-opening polymerization in the molten state. This polymerization process is a bulk ring-opening polymerization process. The ring-opening polymerization of a cyclic ester in a moltent state may be performed by using a reaction vessel or a tubular, columnar or extruder-type reaction vessel in a batch or in a continuous manner.

In the present invention, it is preferred to adopt a process of transferring a cyclic ester in a molten state to a polymerization apparatus equipped with a plurality of tubes (including those having both ends capable of opening and closing as preferable embodiments) and effecting the ring-opening polymerization in each tube placed in a hermetic state to precipitate the resultant polymer. It is also preferred to adopt a process of proceeding with ring-opening polymerization of a molten cyclic ester in a reaction vessel equipped with a stirrer, taking up the resultant polymer to once cool and solidify the polymer and then further continuing solid-phase polymerization below the melting point of the polymer. These processes may be performed either batchwise or in a continuous manner. In any case, by adopting a method of controlling the polymerization temperature in a hermetic state (i.e., in a reaction system with no gaseous phase), it is possible to produce a polymer having target molecular weight and physical properties, such as melt viscosity, stably and at a good reproducibility.

According to the process of the present invention, polyglycolic acid having a melt viscosity of preferably 50 to 6,000 Pa·s, more preferably 100 to 5,000 Pa·s as measured at a temperature of 240° C. and a shear rate of 121 sec$^{-1}$ can be provided by ring-opening polymerization of a cyclic ester (for example, glycolide or a cyclic ester comprising glycolide as a main component). According to the process of the present invention, a high-molecular weight aliphatic polyester having a weight-average molecular weight of preferably at least 50,000, more preferably 80,000, particularly preferably at least 100,000 can be produced. The upper limit of the weight-average molecular weight is about 500,000.

Further, according to the process of the present invention, it is possible to obtain an aliphatic polyester having a yellowness index (YI) of ca. 4-30, and the yellowness index can be controlled by adjusting the molecular weight. For example, a polymer having a yellowness index (YI) of 20 or below can be obtained by adjusting the molecular weight to at most 200,000, preferably, 80,000 or below.

Further, it is also preferred that the aliphatic polyester produced in the above manner is compounded (i.e., formed into a compound) with a carboxyl group-capping agent. As the carboxyl group-capping agent, it is possible to use compounds generally known as moisture resistance-improving agents for aliphatic polyesters such as polylactic acid (refer to, e.g., JP-A 2001-261797). Examples thereof may include: carbodiimide compounds inclusive of monocarbodiimides and polycarbodiimides, such as N,N-2,6-diisopropylphenyl-carbodiimides; oxazoline compounds, such as 2,2'-m-phenylene-bis(2-oxazoline), 2,2'-p-phenylenebis(2-oxazoline), 2,2-phenyl-2 oxazoline and styrene-isopropenyl-2-oxazoline; oxazine compounds, such as 2-methoxy-5,6-dihydro-4H-1,3-oxazine; and epoxy compounds, such as N-glycidyldiphthalimide and cyclohexene oxide.

Among these, carbodiimide compounds are preferred, and particularly those having a high purity can exhibit an excellent moisture resistance-stabilizing effect.

These carboxyl group-capping agents can be used in combination of two or more species, as desired, and may preferably be used in a proportion of 0.01-10 wt. parts, more preferably 0.05-5 wt. parts, particularly 0.1-3 wt. parts, per 100 wt. parts of the aliphatic polyester.

The aliphatic polyester can be further compounded with 0.003-3 wt. parts, preferably 0.005-1 wt. part, of a thermal stabilizer per 100 wt. parts thereof in addition to the carboxyl group-capping agent. As the thermal stabilizer, phosphoric acid esters having a pentaerythritol skeleton and phosphoric acid alkyl esters may preferably be used singly or in combination. By compounding the carboxyl group-capping agent and the thermal stabilizer, it is possible to obtain synergistic effects in suppressing the coloring and hydrolyzation of the resultant aliphatic polyester.

The above-mentioned carboxyl group-capping agent (and optionally added thermal stabilizer) can be added during the polymerization, but may preferably be added at the time of formation of pellets of the aliphatic polyester produced by polymerization. They can also be added both in the course of pelletization and during polymerization.

EXAMPLES

The present invention will hereinafter be described more specifically by the following Syntheses Examples, Examples and Comparative Examples. Analyzing methods, measuring methods, calculating methods, etc. are as follows:

(1) Impurity Determining Analysis:

A precisely weighed amount (ca. 1 g) of glycolide and 25 mg of 4-cholorobenzophenone as an internal standard substance were added into 10 ml of high-purity acetone and sufficiently dissolved therein. Ca. 1 ml of the resultant solution was taken out, and an ethyl ether solution of diazomethane was added to the solution. The diazomethane solution was added in an amount of leaving a yellow color of diazomethane as an approximate measure. The yellow-colored solution (2 µl) was charged into a gas chromatograph to determine methyl-esterified glycolic acid and a glycolic acid dimmer on the basis of an area ratio of the internal standard substance and the amounts of the glycolide and internal standard substance added.

<Conditions of Gas Chromatographic Analysis>
Apparatus: Hitachi G-3000,
Column: TC-17 (0.25 mm in diameter×30 m in length),
Temperature of vaporizing chamber: 290° C.,
Column temperature: After retained at 50° C. for 5 minutes, raising the temperature to 270° C. at a heating rate of 20° C./min and holding at 270° C. for 4 minutes, and
Detector: FID (flame ionization detector), temperature: 300° C.

With respect to lactide, impurities were determined in the same manner as in glycolide.

(2) Quantitative Determination of Water:

A Karl Fischer's aquameter ("CA-100", made by Mitsubishi Kagaku K.K.) equipped with a vaporizer (VA-100") was used, and a precisely weighed amount (ca. 2 g) of a polymer sample was placed in the vaporizer preset to 220° C. and heated. A dry nitrogen gas was passed at a flow rate of 250 ml/min through the Karl Fischer's aquameter from the vaporizer. After the sample was introduced into the vaporizer, water vaporized was introduced into a Karl Fischer's solution. An end point was determined to be a point of time when an electric conductivity was lowered to +0.1 µg/S from the background. With respect to the determination of water in a monomer, the temperature of the vaporizer was preset to 140° C., and an end point was determined to be a point of time an electric conductivity was lowered to +0.05 µg/S from the background.

(3) Determination of Water in Monomer-Melting Vessel:

Dry air was allowed to flow in the interior of a monomer-melting vessel in advance to find a relative humidity of its atmosphere by means of a hydrometer. An absolute temperature was calculated from a temperature of the atmosphere to calculate out an amount of water from this absolute temperature and the volume of the vessel.

(4) Calculation of Carboxyl (Carboxylic Acid)—Source Compound Concentration:

A total carboxyl concentration in a cyclic ester is calculated on the basis of the total amount of hydroxycarboxylic compounds and water contained in the cyclic ester. A proton concentration (mol %) based on the hydroxycarboxylic compounds is calculated on the basis of the contents and molecular weights of the respective compounds and the number of hydroxyl groups. On the other hand, a proton concentration (mol %) based on water is calculated on the basis of the total amount of water of impurities contained in the cyclic ester, water contained in the atmosphere of a treating vessel, etc., and water added and the molecular weight of water.

(5) Concentration of Alkoxycarbonyl (Ester)-Source Compound

Calculated as a mol concentration of an alcohol added for the polymerization with respect to the monomer.

(6) Total Proton Concentration and Carboxylic Acid/Ester Mol Ratio

From the concentration of carboxyl (carboxylic acid)-source compound and concentration of the alkoxycarbonyl (ester)-source compound determined in (4) and (5) above, a total proton concentration is determined as a sum of these, and a carboxylic acid/ester mol ratio is determined as a ratio between these.

Details of the calculation method for Polymerization Example 1b described hereafter are as follows.

<Molecular Weight>

The following values were used as molecular weights of respective components in the glycolide (cyclic ester) monomer.

glycolide: 116.07
glycolic acid: 76.05
glycolic acid dimer: 134.09
water: 18.02
dodecyl alcohol: 186.34

<Carboxyl(Carboxylic Acid)—Source Compound Concentration of Impurities in the Charged Monomer>

The concentrations (weight basis) of impurities in the charged glycolide were 30 ppm of glycolic acid, 310 ppm of glycolic acid dimer and 20 ppm of water. As the molecular weight of glycolide is 116.07, proton concentrations given by the respective impurities can be calculated in the following manner:

glycolic acid: 30 ppm $$116.07 \times 30 \times 10^{-6} \div 76.05 \times 100 = 0.0046 \text{ mol \%} \quad (i)$$

glycolic acid dimer: 310 ppm $$116.07 \times 310 \times 10^{-6} \div 134.09 \times 100 = 0.027 \text{ mol \%} \quad (ii)$$

water: 20 ppm $$116.07 \times 20 \times 10^{-6} \div 18.02 \times 100 = 0.013 \text{ mol \%} \quad (iii)$$

Total carboxyl(carboxylic acid)—source compound concentration given by the impurities $$(i)+(ii)+(iii)=0.0046+0.027+0.021=0.013$$
$$\approx 0.044 \text{ mol \%} \quad (iv)$$

<Water in the Monomer Dissolution Vessel>

The atmosphere in the reaction vessel (volume: 56 liters) after removing the moisture as far as possible by blowing in dry air exhibited: temperature=21° C. and relative humidity=25%. The atmosphere exhibited an absolute moisture of 5.0 g/m³ and gave a moisture in the inner volume of 56 liters of the monomer distribution vessel calculated as 5.0×0.056=0.28 g. This corresponds to a concentration in 22500 g (=194.0 mol) of glycolide monomer later added of $$0.28/22500 \times 10^6 = 12 \text{ ppm}$$

$$(0.28/18.02) \div 194 \times 100 = 0.008 \text{ mol \%} \quad (v)$$

<Added Water>

1.1 g of water was added, giving a concentration with respect to 22500 g (=194.0 mol) of glycolide monomer as follows:

$$1.1/22500 \times 10^6 = 48.89 \text{ ppm}$$

$$(1.1/18.02) \div 194 \times 100 = 0.031 \text{ mol \%} \quad (vi)$$

<Carboxyl (Carboxylic Acid)—Source Compound Concentration>

$$(iv)+(v)+(vi)=0.044+0.008+0.031=0.083 \text{ mol \%}.$$

Incidentally, a portion of the content in the monomer dissolution vessel was sampled after charging glycolide and adding water and heating to provide a uniform state for quantitative analysis of impurities (water, glycolic and glycolic acid dimer) to determine a total proton concentration after charging and dissolution of glycolide, which exhibited a good agreement with the calculated total proton concentration based on the impurities (moisture, glycolic acid and glycolic acid dimer) in the glycolide before charging and the amount of added water.

<Alkoxycarbonyl(Ester)—Source Compound Concentration>

17.08 g of dodecyl alcohol was added. With respect to 22500 g (=19410 mol) of glycolide monomer, this gives $$(17.0/186.34) \div 194 \times 100 = 0.047 \text{ mol \%} \quad (viii).$$

<Total Proton Concentration>

$$(vii)+(viii)=0.083+0.047=0.130 \text{ mol \%}.$$

<Carboxyl (Carboxylic Acid)/Alkoxycarbonyl (Ester) Mol Ratio>

$$(vii)/(viii)=0.083/0.047=1.77.$$

(7) Melt Viscosity:

A polymer sample was placed in a drying oven heated to 120° C. and brought into contact with dry air to reduce its water content to 100 ppm or lower. Thereafter, the sample was sufficiently dried in the drying oven. The melt viscosity was measured by means of a Capirograph 1-C (made by K.K. Toyo Seiki Seisakusho) equipped with a capillary (1 mm in diameter×10 mm in length). After ca. 20 g of the sample was placed in the apparatus heated to a presetting temperature of 240° C. and held for 5 minutes, the melt viscosity was measured at a shear rate of 121 sec$^{-1}$.

(8) Measurement of Molecular Weight:

An amorphous polymer was provided and dissolved in a solvent for measurement of a molecular weight. More specifically, ca. 5 g of a sample fully dried was held between aluminum plates, placed on a hot press heated to 275° C., heated for 90 seconds and then pressed for 60 seconds under a pressure of 2 MPa. Thereafter, the polymer was immediately dipped in iced water to be quenched. Thus, a transparent amorphous pressed sheet was produced.

A sample (10 mg) was cut out of the thus-prepared pressed sheet. This sample was dissolved in a solution with 5 mM of sodium trifluoroacetate dissolved in hexafluoroisopropanol (HFIP) to prepare a 10 ml of a solution. After the sample solution was filtered through a membrane filter, it was charged into a gel permeation chromatograph (GPC) to measure its molecular weight. Incidentally, the sample was charged into GPC within 30 minutes after the dissolution.

<Conditions of GPC Measurement>

Apparatus: Shimadzu LC-9A,

Column: HFIP-806M, 2 columns and pre-column were connected in series,

Column temperature: 40° C.,

Eluent: HFIP solution with 5 mM of sodium trifluoroacetate,

Flow rate: 1 ml/min,

Detector: Differential refractive index detector (RI), and

Molecular weight calibration: Five standard PMMAs having different molecular weights were used.

(9) Determination of Carboxylic Acid Concentration

Ca. 0.3 g of sample was taken out and accurately weighed from a press sheet prepared in the same manner as the sample for molecular weight determination, and was completely dissolved in 10 ml of reagent-grade dimethyl sulfoxide in ca. 3 minutes on an oil bath at 150° C. To the resultant solution, 2-3 drops of an indicator (bromo-thymol blue dissolved in alcohol), and 0.02N-sodium hydroxide, benzyl alcohol solution was added until a termination point which was judged by observation with eyes as a point of color change of the solution from yellow to green. From the amount of addition until the termination point, a carboxyl group concentration was calculated.

(10) Evaluation of Moisture Resistance.

A pellet sample was sufficiently dried with dry air at 120° C., placed on a hot press at 250° C. for 3 min. of heating and then subjected to application of a pressure of 8 MPa. Immediately thereafter, the sample was cooled by transferring to a press machine cooled with circulating water and pressed at 5 MPa for ca. 5 min., to provide a transparent amorphous pressed sheet.

A sample in a prescribed size was cut out from the above-prepared pressed sheet and fixed on a frame to be placed in a drying oven for heating at 70° C. for 1 min., followed by blow stretching at an areal ratio of 10-15 times by blowing air thereto. The film thus obtained was fixed on a frame and heat-treated for 1 min. at 200° C.

Ca. 10 mg of samples were cut out from the above-prepared sample in a film state and left standing for prescribed periods in a vessel at constant temperature and humidity of 80° C. and 95% RH. Then, the samples were taken out to measure molecular weights thereof by GPC.

Polymerization degrees were calculated from the thus-measured number-average molecular weights, and reciprocals thereof were plotted on a logarithmic scale verseus the standing periods to take a slope of an approximate straight line of the plots as a hydrolysis rate constant.

Further, a time for a number-average molecular weight (Mw) to reach (decrease) down to 20,000 was read from a graph.

Monomer Syntheses Example 1

A vessel (also referred to as "reaction vessel") equipped with an agitator and a jacket was charged with a 70% by weight aqueous solution of glycolic acid. While agitating under atmospheric pressure, the solution within the vessel was heated to a temperature of 200° C. by circulating a heat transfer oil into the jacket to conduct a condensation reaction while distilling off water formed out of the system. While reducing the pressure within the vessel stepwise to 3 kPa in a state that the reaction mixture within the vessel was kept at 200° C., low-boiling substances such as the water formed and an unreacted raw material were distilled off to obtain a glycolic acid oligomer.

The glycolic acid oligomer prepared above was charged into a SUS304-made vessel equipped with an agitator and a jacket, diethylene glycol dibutyl ether as a solvent was added, and polyethylene glycol as a solubilizing agent was further added. A mixture of the glycolic acid oligomer and the solvent was subjected to a depolymerization reaction under heat and reduced pressure, and glycolide formed was distilled out together with the solvent. The distillate was condensed in a double-pipe condenser through which hot water was circulated. The condensate was received by a receiver at room temperature. The solvent in an amount corresponding to the amount of the solvent distilled out was continuously supplied to the reaction vessel for the purpose of keeping the amount of the solvent in the reaction mixture constant.

The reaction was continued to distill out a mixture of glycolide and the solvent, and the distillate was condensed. Glycolide separated out from the condensate was subjected to solid-liquid separation and recrystallized with 2-propanol and then vacuum-dried. The purity of the resultant glycolide was 99.99% as determined by means of a differential scanning calorimeter (DSC).

Monomer Synthesis Example 2

A condensate was obtained in the same manner as in Synthesis Example 1 except that the solubilizing agent was changed from polyethylene glycol to octyltetratriethylene glycol. The condensate was received by a receiver having a jacket through which hot water was circulated. The condensate within the receiver was separated into 2 liquid layers, in which an upper layer was the solvent, and a lower layer was liquid glycolide. Even after the 2 layers were formed, the depolymerization reaction was continued, and the co-distillation was continued. As a result, glycolide cooled by the condenser was passed in the form of droplets through the solvent layer and merged by condensation within the lower glycolide layer. The upper solvent layer was continuously returned to the reaction vessel for the purpose of keeping the amount of the solvent in the reaction mixture constant. The pressure of the reaction system was temporally returned to atmospheric pressure to take out the liquid glycolide from a bottom of the receiver. The pressure was restored again to continue the depolymerization reaction. This process was repeated several times.

The glycolide recovered from the depolymerization reaction system was purified by the recrystallization in Syntheses Example 1, whereas the glycolide was purified by means of a tower type purifier in this Example. After the depolymerization, crude glycolide crystals obtained by solid-liquid separation were continuously charged at a constant rate into a charging port for crude crystals provided at a lower part of the tower-type purifier. The glycolide was agitated by an agitator installed in the interior of the tower-type purifier wherein the crude glycolide was caused for purification by countercurrent contact between a falling melt of a purified crystal component with the rising crude glycolide crystals within the purifier. The crystals after the purification were continuously discharged at a fixed rate from a take-off port provided at an upper part of the purifier. The purity of the purified glycolide recovered was at least 99.99% as determined by means of DSC.

Example 1 (Polymerization Examples)

Production of Samples 1a, 1b and 1c

Polymerization Example 1a

Moisture in a 56-liter SUS-made closable vessel (monomer dissolution vessel) equipped with a steam jacket structure and an agitator was removed as far as possible by blowing dry air thereinto. After a prescribed time (3 hours), the atmosphere in the vessel exhibited a temperature of 21.5° C. and a relative humidity of 27%. The atmosphere exhibited an absolute moisture of 5.1 g/m$^3$, from which a moisture in the vessel was calculated in view of the vessel inner volume to provide 0.26 g (=5.1 g/m$^3$×0.056 m$^3$). The vessel was charged with 22500 g of the glycolide prepared in Synthesis Example 1 (containing 30 ppm of glycolic acid, 310 ppm of glycolic acid dimer and 20 ppm of water giving a total impurity proton concentration of 0.044 mol %), 0.68 g (30 ppm) of tin dichloride dihydrate and 28.2 g of 1-dodecyl alcohol determined so as to adjust a total proton concentration (a set proton concentration) to 0.13 mol % while taking the moisture (0.26 g) contained in the atmosphere of the dissolution vessel, and then the vessel was immediately closed hermetically. The mol concentration (proportion) of the 1-dodecyl alcohol in the charge with respect to the total (set) proton concentration was 60%, thus giving a carboxylic acid/ester mol ratio of 40/60.

The vessel was closed, and steam was circulated in the jacket to heat the contents to 100° C. under agitation. The contents became a uniform liquid in the course of the heating. While keeping the temperature of the contents at 100° C., they were transferred to an apparatus comprising tubes made of a metal (SUS304) and each having an inner diameter of 24 mm. The apparatus was composed of a body part, in which the tubes were provided, and upper and lower plates made of a metal (SUS304) and so constructed that all the body part and upper and lower plates were equipped with a jacket, and a heat transfer oil was circulated in the jacket. When the contents were transferred to this apparatus, the contents were charged from an upper opening of each tube of which the lower opening had been closed with the lower plate fitted thereto.

After completion of the transfer, the upper plate was immediately fitted to close the upper opening. The heat transfer oil heated to 170° C. was circulated in the jacket parts of the body part and upper and lower plates, and the contents were held for 7 hours. After the prescribed period of time, the heat transfer oil circulated in the jacket parts was cooled, thereby cooling the polymerization equipment to nearly room temperature. After the cooling, the lower plate was removed to take out the resultant polyglycolic acid in a bulk state from the lower opening. According to this polymerization system, the yield reached almost 100%. The bulk product was pulverized to obtain PGA Sample 1a.

Polymerization Example 1b

The same operation as in the above Polymerization Example 1a was repeated except that the water (moisture) contained in the atmosphere of the dissolution vessel was 0.28 g (21° C., 25% RH), and 1.1 g of water and 17.0 g of 1-dodecyl alcohol were charged instead of the 28.2 g of 1-dodecyl alcohol. The mol concentration (proportion) of the 1-dodecyl alcohol with respect to the total (set) proton concentration was 42%, and the carboxylic acid/ester mol ratio was 58/42. After the polymerization and pulverization, PGA Sample 1b was obtained.

Polymerization Example 1c

The same operation as in the above Polymerization Example 1a was repeated except that the water (moisture) contained in the atmosphere of the dissolution vessel was 0.28 g (21° C., 27% RH), and 2.7 g of water was charged instead of the 28.2 g of 1-dodecyl alcohol. The mol concentration (proportion) of the 1-dodecyl alcohol with respect to the total (set) proton concentration was 0%, and the carboxylic acid/ester mol ratio was 100/0. After the polymerization and pulverization, PGA Sample 1c was obtained.

Polymerization conditions, the properties of the resultant polymers and the hydrolyzabilities of the films thereof are shown in Table 1.

Example 2 (Polymerization Examples)

Production of Samples 2a, 2b, 2c and 2d

The same operation as in Example 1 was repeated except that the water (moisture) contained in the atmosphere of the dissolution vessel was 0.35 g (22.5° C., 31% RH), and varying proportions of 1-dodecyl alcohol and water were changed so as to provide a total (set) proton concentration of 0.22 mol %. At mol concentrations (proportions) of charged 1-dodecyl alcohol with respect to the total proton concentrations of 75%, 57%, 44% and 0% (25/75, 43/57, 56/44 and 100/0 as carboxylic acid/ester mol ratios), PGA Samples 2a, 2b, 2c and 2d were obtained, respectively.

Polymerization conditions, the properties of the resultant polymers and the hydrolyzabilities of the films thereof are shown in Table 2.

Example 3 (Polymerization Examples)

Production of Samples 3a, 3b, 3c and 3d

The same operation as in Example 1 was repeated except that the water (moisture) contained in the atmosphere of the dissolution vessel was 0.35 g (22.5° C., 31% RH), 22500 g of the glycolide produced in Monomer Synthesis Example 2 (containing 40 ppm of glycolic acid, 400 ppm of glycolic acid dimer and 30 ppm of water giving a total impurity proton concentration of 0.060 mol %) was used, and varying proportions of t-butyl alcohol and water were charged so as to provide a total (set) proton concentration of 0.40 mol %. At mol concentrations (proportions) of charged t-butyl alcohol with respect to the total proton concentrations of 82%, 64%, 47% and 0% (82/1/, 36/64, 53/47 and 100/0 as carboxylic acid/ester mol ratios), PGA Samples 3a, 3b, 3c and 3d were obtained, respectively.

Polymerization conditions, the properties of the resultant polymers and the hydrolyzabilities of the films thereof are shown in Table 3.

Example 4 (Compounding Examples)

Production of Samples 4a, 4b and 4c

The respective samples produced in Example 1 were sufficiently dried, 100 weight parts each thereof were blended with 0.03 wt part of mono- and di-stearyl acid phosphate ("ADEKASTAB AX-71") made by Asahi Denka Kogyo K.K.), and each blend was melt-kneaded and extruded through a twin-screw extruder ("LT-20", made by K.K. Toyo Seiki Seisakusho) with a set maximum cylinder temperature of 240° C. to obtain pellets.

Extrusion conditions, the properties of the resultant pellets and the hydrolyzabilities of the films thereof are shown in Table 4.

Example 5 (Compounding Examples)

Production of Samples 5a, 5b 5c and 5d

The respective samples produced in Example 2 were sufficiently dried, 100 weight parts each thereof were blended with 0.03 wt part of mono- and di-stearyl acid phosphate ("ADEKASTAB AX-71") made by Asahi Denka Kogyo K.K.), and each blend was melt-kneaded and extruded through a twin-screw extruder ("LT-20", made by K.K. Toyo Seiki Seisakusho) with a set maximum cylinder temperature of 240° C. to obtain pellets.

Extrusion conditions, the properties of the resultant pellets and the hydrolyzabilities of the films thereof are shown in Table 5.

Example 6 (Compounding Examples)

Production of Samples 6a, 6b and 6c

The respective samples produced in Example 1 were sufficiently dried, 100 weight parts each thereof were blended with 0.03 wt part of mono- and di-stearyl acid phosphate ("ADEKASTAB AX-71") made by Asahi Denka Kogyo K.K.) and 0.5 or 1 wt. part of high purity (94.8%)-N,N-2.6-diisopropylphenylcarbodiimide, and each blend was melt-kneaded and extruded through a twin-screw extruder ("LT-20", made by K.K. Toyo Seiki Seisakusho) with a set maximum cylinder temperature of 240° C. to obtain pellets.

Extrusion conditions, the properties of the resultant pellets and the hydrolyzabilities of the films thereof are shown in Table 6.

Example 7 (Compounding Examples)

Production of Samples 7a, 7b 7c and 7d

The respective samples produced in Example 2 were sufficiently dried, 100 weight parts each thereof were blended with 0.03 wt part of mono- and di-stearyl acid phosphate ("ADEKASTAB AX-71") made by Asahi Denka Kogyo K.K.) and 0.5 or 1 wt. part of high purity (94.8%)-N,N-2.6-diisopropylphenylcarbodiimide, and each blend was melt-kneaded and extruded through a twin-screw extruder ("LT-20", made by K.K. Toyo Seiki Seisakusho) with a set maximum cylinder temperature of 240° C. to obtain pellets.

Extrusion conditions, the properties of the resultant pellets and the hydrolyzabilities of the films thereof are shown in Table 7.

Example 8 (Compounding Examples)

Production of Samples 8a, 8b 8c and 8d

The respective samples produced in Example 3 were sufficiently dried, 100 weight parts each thereof were blended with 0.03 wt part of mono- and di-stearyl acid phosphate ("ADEKASTAB AX-71") made by Asahi Denka Kogyo K.K.) and 0.5 or 1 wt. part of high purity (94.8%)-N,N-2.6-diisopropylphenylcarbodiimide, and each blend was melt-kneaded and extruded through a twin-screw extruder ("LT-20", made by K.K. Toyo Seiki Seisakusho) with a set maximum cylinder temperature of 240° C. to obtain pellets.

Extrusion conditions, the properties of the resultant pellets and the hydrolyzabilities of the films thereof are shown in Table 8.

TABLE 1

| | | | | Example | | |
|---|---|---|---|---|---|---|
| | | | | 1a | 1b | 1c |
| Polymerization conditions | | Molecular weight-adjusting agent | | Water DoOH* | Water DoOH* | Water |
| | | Set proton concentration | mol % | | 0.13 | |
| | | Monomer concentration | | | | |
| | | Water | ppm | | 20 | |
| | | Impurity total proton concentration | mol % | | 0.044 | |
| | | Dissolution vessel | | | | |
| | | Water (moisture) | g | 0.26 | 0.28 | 0.28 |
| | | Additive | | | | |
| | | DoOH* | g | 28.2 | 17.0 | 0 |
| | | Water | g | 0 | 1.1 | 2.7 |
| | | Charged composition | | | | |
| | | Carboxylic acid/ester mol ratio | mol/mol | 40/60 | 58/42 | 100/0 |
| Polymer properties | Pellet | Water | ppm | 35 | 20 | 40 |
| | | Melt viscosity (MV) | Pa · s | 3,700 | 4,060 | 3,800 |
| | | Weight-average molecular weight (Mw) | — | 206,100 | 208,000 | 208,100 |
| | | Number-average molecular weight (Mn) | — | 85,900 | 88,300 | 83,300 |
| | | Polydisperse factor (Mw/Mn) | — | 2.4 | 2.4 | 2.5 |
| | | Carboxylic acid concentration | eq/t | 13 | 19 | 29 |
| | Film | Hydrolyzation rate constant ($\times 10^{-4}$) | 1/s | 3.1 | 3.6 | 4.1 |
| | | Time down to Mn = 20000 | hr | 56 | 50 | 41 |

*DoOH: 1-dodecyl alcohol

TABLE 2

|  |  |  | Example | | | |
|---|---|---|---|---|---|---|
|  |  |  | 2a | 2b | 2c | 2d |
| Polymerization conditions | Molecular weight-adjusting agent |  | Water DoOH* | Water DoOH* | Water DoOH* | Water |
|  | Set proton concentration | mol % |  |  | 0.22 |  |
|  | Monomer concentration |  |  |  |  |  |
|  | Water | ppm |  |  | 20 |  |
|  | Impurity total proton concentrations | mol % |  |  | 0.044 |  |
|  | Dissolution vessel |  |  |  |  |  |
|  | Water (moisture) | g | 0.35 | 0.35 | 0.35 | 0.35 |
|  | Additive |  |  |  |  |  |
|  | DoOH* | g | 59.8 | 45.0 | 35.0 | 0 |
|  | Water | g | 0 | 1.4 | 2.4 | 5.8 |
|  | Charged composition |  |  |  |  |  |
|  | Carboxylic acid/ester mol ratio | mol/mol | 25/75 | 43/57 | 56/44 | 100/0 |
| Polymer properties | Pellet | Water | ppm | 25 | 20 | 30 | 27 |
|  |  | Melt viscosity (MV) | Pa · s | 2,140 | 2,300 | 2,100 | 2,400 |
|  |  | Weight-average molecular weight (Mw) | — | 181,000 | 183,600 | 181,800 | 184,500 |
|  |  | Number-average molecular weight (Mn) | — | 82,200 | 79,800 | 82,600 | 76,900 |
|  |  | Polydisperse factor (Mw/Mn) | — | 2.2 | 2.3 | 2.2 | 2.4 |
|  |  | Carboxylic acid concentration | eq/t | 10 | 15 | 19 | 31 |
|  | Film | Hydrolyzation rate constant ($\times 10^{-4}$) | 1/s | 2.8 | 3.3 | 3.5 | 4.2 |
|  |  | Time down to Mn = 20000 | hr | 59 | 49 | 48 | 37 |

*DoOH: 1-dodecyl alcohol

TABLE 3

|  |  |  | Example | | | |
|---|---|---|---|---|---|---|
|  |  |  | 3a | 3b | 3c | 3d |
| Polymerization conditions | Molecular weight-adjusting agent |  | Water tBuOH* | Water tBuOH* | Water tBuOH* | Water |
|  | Set proton concentration | mol % |  |  | 0.40 |  |
|  | Monomer concentration |  |  |  |  |  |
|  | Water | ppm |  |  | 30 |  |
|  | Impurity total proton concentration | mol % |  |  | 0.06 |  |
|  | Dissolution vessel |  |  |  |  |  |
|  | Water (moisture) | g | 0.40 | 0.40 | 0.40 | 0.40 |
|  | Additive |  |  |  |  |  |
|  | DoOH* | g | 47.2 | 36.7 | 27.0 | 0 |
|  | Water | g | 0 | 2.6 | 4.9 | 11.5 |
|  | Charged composition |  |  |  |  |  |
|  | Carboxylic acid/ester mol ratio | mol/mol | 18/82 | 36/64 | 53/47 | 100/0 |
| Polymer properties | Pellet | Water | ppm | 37 | 25 | 20 | 22 |
|  |  | Melt viscosity (MV) | Pa · s | 830 | 1,000 | 800 | 920 |
|  |  | Weight-average molecular weight (Mw) | — | 141,600 | 147,900 | 136,700 | 143,800 |
|  |  | Number-average molecular weight (Mn) | — | 56,600 | 59,200 | 59,500 | 62,500 |
|  |  | Polydisperse factor (Mw/Mn) | — | 2.5 | 2.5 | 2.3 | 2.3 |

TABLE 3-continued

|   |   |   | Example | | | |
|---|---|---|---|---|---|---|
|   |   |   | 3a | 3b | 3c | 3d |
|   | Carboxylic acid concentration | eq/t | 10 | 16 | 22 | 37 |
| Film | Hydrolyzation rate constant (×10$^{-4}$) | 1/s | 2.8 | 3.3 | 3.7 | 4.4 |
|   | Time down to Mn = 20000 | hr | 39 | 35 | 31 | 28 |

*tBuOH: t-butyl alcohol

TABLE 4

|   |   |   |   | Example | | |
|---|---|---|---|---|---|---|
|   |   |   |   | 4a | 4b | 4c |
| Extrusion conditions |   | Polymer |   | 1a | 1b | 1c |
|   |   |   | wt. parts | 100 | 100 | 100 |
|   |   | Thermal stabilizer* | wt. parts | 0.03 | 0.03 | 0.03 |
| Polymer properties | Pellet | Water | ppm | 18 | 15 | 18 |
|   |   | Melt viscosity (MV) | Pa·s | 4,200 | 4,300 | 4,400 |
|   |   | Weight-average molecular weight (Mw) | — | 209,100 | 210,100 | 211,000 |
|   |   | Number-average molecular weight (Mn) | — | 83,600 | 89,200 | 87,900 |
|   |   | Polydisperse factor (Mw/Mn) | — | 2.5 | 2.4 | 2.4 |
|   |   | Carboxylic acid concentration | eq/t | 11 | 20 | 29 |
|   | Film | Hydrolyzation rate constant (×10$^{-4}$) | 1/s | 3.2 | 3.6 | 4.1 |
|   |   | Time down to Mn = 20000 | hr | 53 | 51 | 44 |

*Thermal stabilizer: mono- and di-stearyl acid phosphate
("ADEKASTAB AX-71", made by Asahi Denka Kogyo K.K.)

TABLE 5

|   |   |   |   | Example | | | |
|---|---|---|---|---|---|---|---|
|   |   |   |   | 5a | 5b | 5c | 5d |
| Extrusion conditions |   | Polymer |   | 2a | 2b | 2c | 2d |
|   |   |   | wt. parts | 100 | 100 | 100 | 100 |
|   |   | Thermal stabilizer* | wt. parts | 0.03 | 0.03 | 0.03 | 0.03 |
| Polymer properties | Pellet | Water | ppm | 16 | 20 | 21 | 19 |
|   |   | Melt viscosity (MV) | Pa·s | 2,350 | 2,500 | 2,400 | 2,600 |
|   |   | Weight-average molecular weight (Mw) | — | 183,600 | 187,000 | 185,300 | 187,800 |
|   |   | Number-average molecular weight (Mn) | — | 76,500 | 74,800 | 80,600 | 78,200 |
|   |   | Polydisperse factor (Mw/Mn) | — | 2.4 | 2.5 | 2.3 | 2.4 |
|   |   | Carboxylic acid concentration | eq/t | 11 | 16 | 19 | 31 |
|   | Film | Hydrolyzation rate constant (×10$^{-4}$) | 1/s | 2.9 | 3.4 | 3.6 | 4.2 |
|   |   | Time down to Mn = 20000 | hr | 53 | 44 | 45 | 37 |

*Thermal stabilizer: mono- and di-stearyl acid phosphate
("ADEKASTAB AX-71", made by Asahi Denka Kogyo K.K.)

TABLE 6

|  |  |  | Example 6a | Example 6b |
|---|---|---|---|---|
| Extrusion conditions | Polymer |  | 1a | 1b |
|  |  | wt. parts | 100 | 100 |
|  | Thermal stabilizer* | wt. parts | 0.03 | 0.03 |
|  | Capping agent** | wt. parts | 0.5 | 1 |
| Polymer properties | Pellet Water | ppm | 20 | 22 |
|  | Melt viscosity (MV) | Pa·s | 3,750 | 3,810 |
|  | Weight-average molecular weight (Mw) | — | 204,500 | 205,500 |
|  | Number-average molecular weight (Mn) | — | 81,800 | 87,300 |
|  | Polydisperse factor (Mw/Mn) | — | 2.5 | 2.4 |
|  | Carboxylic acid concentration | eq/t | 4 | 4 |
|  | Film Hydrolyzation rate constant (×10⁻⁴) | 1/s | 1.8 | 1.7 |
|  | Time down to Mn = 20000 | hr | 92 | 104 |

*Thermal stabilizer: mono- and di-stearyl acid phosphate ("ADEKASTAB AX-71", made by Asahi Denka Kogyo K.K.)
**Capping agent: N,N-2,6-diisopropylphenylcarbodiimide

TABLE 7

|  |  |  | Example 7a | Example 7b | Example 7c |
|---|---|---|---|---|---|
| Extrusion conditions | Polymer |  | 2a | 2b | 2c |
|  |  | wt. parts | 100 | 100 | 100 |
|  | Thermal stabilizer* | wt. parts | 0.03 | 0.03 | 0.03 |
|  | Capping agent** | wt. parts | 0.5 | 0.03 | 0.03 |
| Polymer properties | Pellet Water | ppm | 24 | 27 | 27 |
|  | Melt viscosity (MV) | Pa·s | 2,000 | 2,100 | 2,050 |
|  | Weight-average molecular weight (Mw) | — | 178,000 | 181,400 | 179,700 |
|  | Number-average molecular weight (Mn) | — | 74,200 | 72,600 | 78,100 |
|  | Polydisperse factor (Mw/Mn) | — | 2.4 | 2.5 | 2.3 |
|  | Carboxylic acid concentration | eq/t | 3 | 5 | 5 |
|  | Film Hydrolyzation rate constant (×10⁻⁴) | 1/s | 1.4 | 1.9 | 1.8 |
|  | Time down to Mn = 20000 | hr | 105 | 76 | 87 |

*Thermal stabilizer: mono- and di-stearyl acid phosphate ("ADEKASTAB AX-71", made by Asahi Denka Kogyo K.K.)
**Capping agent: N,N-2,6-diisopropylphenylcarbodiimide ("DIPC", made by Kawaguchi Kagaku Kogyo K.K.)

TABLE 8

|  |  |  | Example 8a | Example 8b | Example 8c |
|---|---|---|---|---|---|
| Extrusion conditions | Polymer |  | 3a | 3b | 3c |
|  |  | wt. parts | 100 | 100 | 100 |
|  | Thermal stabilizer* | wt. parts | 0.03 | 0.03 | 0.03 |
|  | Capping agent** | wt. parts | 0.5 | 0.03 | 0.03 |
| Polymer properties | Pellet Water | ppm | 25 | 22 | 22 |
|  | Melt viscosity (MV) | Pa·s | 790 | 940 | 780 |
|  | Weight-average molecular weight (Mw) | — | 137,600 | 144,700 | 132,200 |

TABLE 8-continued

| | | | Example | | |
|---|---|---|---|---|---|
| | | | 8a | 8b | 8c |
| | Number-average molecular weight (Mn) | — | 59,800 | 57,900 | 55,100 |
| | Polydisperse factor (Mw/Mn) | — | 2.3 | 2.5 | 2.4 |
| | Carboxylic acid concentration | eq/t | 6 | 6 | 8 |
| Film | Hydrolyzation rate constant (×10⁻⁴) | 1/s | 2.1 | 2.1 | 2.5 |
| | Time down to Mn = 20000 | hr | 55 | 53 | 42 |

*Thermal stabilizer: mono- and di-stearyl acid phosphate ("ADEKASTAB AX-71", made by Asahi Denka Kogyo K.K.)
**Capping agent: N,N-2,6-diisopropylphenylcarbodiimide ("DIPC", made by Kawaguchi Kagaku Kogyo K.K.)

INDUSTRIAL APPLICABILITY

As described above, according to the present invention, the ring-opening polymerization of a cyclic ester is performed by using an alcohol and water positively as initiators or/and molecular weight-adjusting agents and by utilizing a total proton concentration and a carboxylic acid/ester mol ratio as polymerization-controlling indexes, to provide an aliphatic polyester having a controlled molecular weight governing initial properties and a controlled hydrolyzability governing properties changing with time.

The invention claimed is:

1. A process for producing an aliphatic polyester, comprising:
subjecting a cyclic ester containing water and an alcohol which function as initiators or/and molecular weight-adjusting agents to ring-opening polymerization while controlling (A) a total concentration in a range of above 0.09 mol % and below 2.0 mol % of proton sources which include carboxyl (carboxylic acid)-source compounds including water, free α-hydroxycarboxylic acid dimer thereof and also alkoxylcarbonyl (ester)-source compounds including the alcohol, and (B) a ratio in a range of 100/-2/98 between a mol concentration of the carboxyl (carboxylic acid)-source compounds and a mol concentration of the alkoxylcarbonyl (ester)-source compounds, so as to provide a desired weight-average molecular weight and a desired hydrolyzation rate constant, respectively, of resultant aliphatic polyester by varying the contents of the water and the alcohol in the cyclic ester.

2. A production process according to claim 1, wherein the carboxylic acid/ester mol ratio is in a range of 99/1-5/95.

3. A production process according to claim 1, wherein the cyclic ester comprises glycolide alone or a mixture of at least 60 wt. % of glycolide and at most 40 wt. % of another cyclic monomer copolymerizable with glycolide by ring-opening polymerization.

4. A production process according to claim 1, wherein the cyclic ester after adjusting the total concentration of proton sources therein is melted under heating in the presence of a catalyst and then the molten cyclic ester is subjected to ring-opening polymerization to precipitate a resultant polymer.

5. A production process according to claim 4, wherein the cyclic ester after adjusting the total concentration of proton sources therein is melted under heating in the presence of a catalyst, then the molten cyclic ester is transferred to a polymerization apparatus equipped with a plurality of tubes, and the cyclic ester is subjected to ring-opening polymerization in an air-tight state within each tube.

6. A production process according to claim 5, wherein the plurality of tubes comprise tubes having both ends that can be open and closed.

7. A production process according to claim 4, wherein the cyclic ester after adjusting the total concentration of proton sources therein is melted under heating in the presence of a catalyst in a melting vessel, then the molten cyclic ester is subjected to ring-opening polymerization in a reaction vessel equipped with a stirrer, and then a resultant polymer is once cooled to be solidified and subjected to solid phase polymerization below the melting point of the polymer.

8. A production process according to claim 1, wherein the aliphatic polyester produced by the ring-opening polymerization is compounded with a carboxyl group-capping agent.

9. A production process according to claim 8, wherein 100 wt. parts of the aliphatic polyester is compounded with 0.1-1.8 wt. parts of the carboxyl group-capping agent.

10. A production process according to claim 8, wherein the carboxyl group-capping agent is selected from the group consisting of monocarbodiimides, polycarbodiimides, oxazolines, oxazines and epoxy compounds.

11. A production process according to claim 8, wherein the carboxyl group-capping agent is a monocarbodiimide.

12. A production process according to claim 1, wherein 100 wt. parts of the aliphatic polyester produced by the ring-opening polymerization is compounded with at most 3 wt. parts of a thermal stabilizer.

* * * * *